Sept. 28, 1971   P. H. O'SHEA   3,608,210
TRAFFIC HAZARD SIMULATOR
Filed Oct. 23, 1969

INVENTOR:
PAUL H. O'SHEA
BY
Pastoriza & Kelly
ATTORNEYS 3,608,210
TRAFFIC HAZARD SIMULATOR
Paul Henry O'Shea, Newport Beach, Calif., assignor to California Automotive Research
Filed Oct. 23, 1969, Ser. No. 868,739
Int. Cl. G09b 9/04
U.S. Cl. 35—11                                         10 Claims

ABSTRACT OF THE DISCLOSURE

A system for testing the driving ability of an automobile driver includes the provision of a plurality of traffic lanes with associated traffic signal red, orange, and green lights. Preselected lights may be programmed to operate in response to closing of an actuating switch so that there is provided an indication as to which lanes are open or closed to traffic. The actuating switch is disposed at a given distance from the entrance areas of the lanes and may take the form of a hose type switch so that an approaching car energizes the signal lights when at a given distance from the lanes. The driver of the car must then make a decision as to which lane is open, if any, within the time period determined by his speed and the said given distance.

This invention relates generally to testing systems and more particularly to a novel traffic hazard simulator method and apparatus for testing the driving ability of an automobile driver.

BACKGROUND OF THE INVENTION

There are presently available many systems for testing an automobile driver's ability. Aside from the usual testing techniques wherein a trained instructor simply drives with a person in his automobile and observes his ability, most systems involve artificially constructed automobiles with projected images of highways and the like wherein various hazards may be displayed to test the driver's reaction thereto. While some of these techniques are valuable, there is no question that the most informative and worthwhile type of testing can best be carried out by a driver physically in his automobile and driving the same under predetermined conditions.

As mentioned above, the only known techniques for testing a driver in his own automobile under actual conditions is for an instructor to travel with the driver. However, there is no assurance that successive drivers to be tested will be faced with similar traffic hazards and therefore there is no means of providing a comparative basis as to different drivers' abilities.

BRIEF DESCRIPTION OF THE PRESENT INVENTION

With the foregoing in mind, a primary object of the present invention is to provide a method and system for simulating certain traffic hazard conditions for a driver while physically driving in his own automobile wherein the simulated conditions themselves may be accurately repeated and are of such a nature as to measure the driver's ability to recognize a problem, arrive at a correct solution to the problem, and execute that solution correctly all within a given time period.

More particularly, the method and system involves the establishing of at least two, and preferably three traffic lanes in an enlarged area such as a parking lot or testing ground. There is then predetermined for each lane certain indications as to whether the lane is open or closed for traffic. Thereafter, a driver in his own automobile approaching the lanes is automatically rendered aware of the indications at a given point in time when he is at a given distance from the lanes and traveling at a given speed. The driver must thus recognize the problem of which lane is open or closed to traffic, arrive at the proper lane to maneuver his car into and execute this arrived at solution or maneuver, all within the given time period as defined by the given distance and given speed.

In certain preferred embodiments of the invention, the indications are in the form of red, orange, and green traffic lights associated with each of the lanes. A programming means is connected to the traffic lights and enables certain ones of the traffic lights to be preselected for energization at a given point in time. This energization is accomplished by an actuating means which as a hose switch placed a given distance from the entrance areas of the lanes so that when an automobile passes over the actuating switch means, the preselected lights are energized thereby providing to the driver an indication as to which lanes, if any, are open or closed to traffic. The driver must then maneuver his automobile accordingly and within the period of time as defined by his speed of travel and the given distance involved.

BRIEF DESCRIPTION OF THE DRAWINGS

A better understanding of the traffic hazard simulator method and system in accord with the present invention will be had by referring to a preferred embodiment thereof as illustrated in the accompanying drawings, in which.

DETAILED DESCRIPTION OF THE PREFERRED EMBODIMENT

Figure 1:
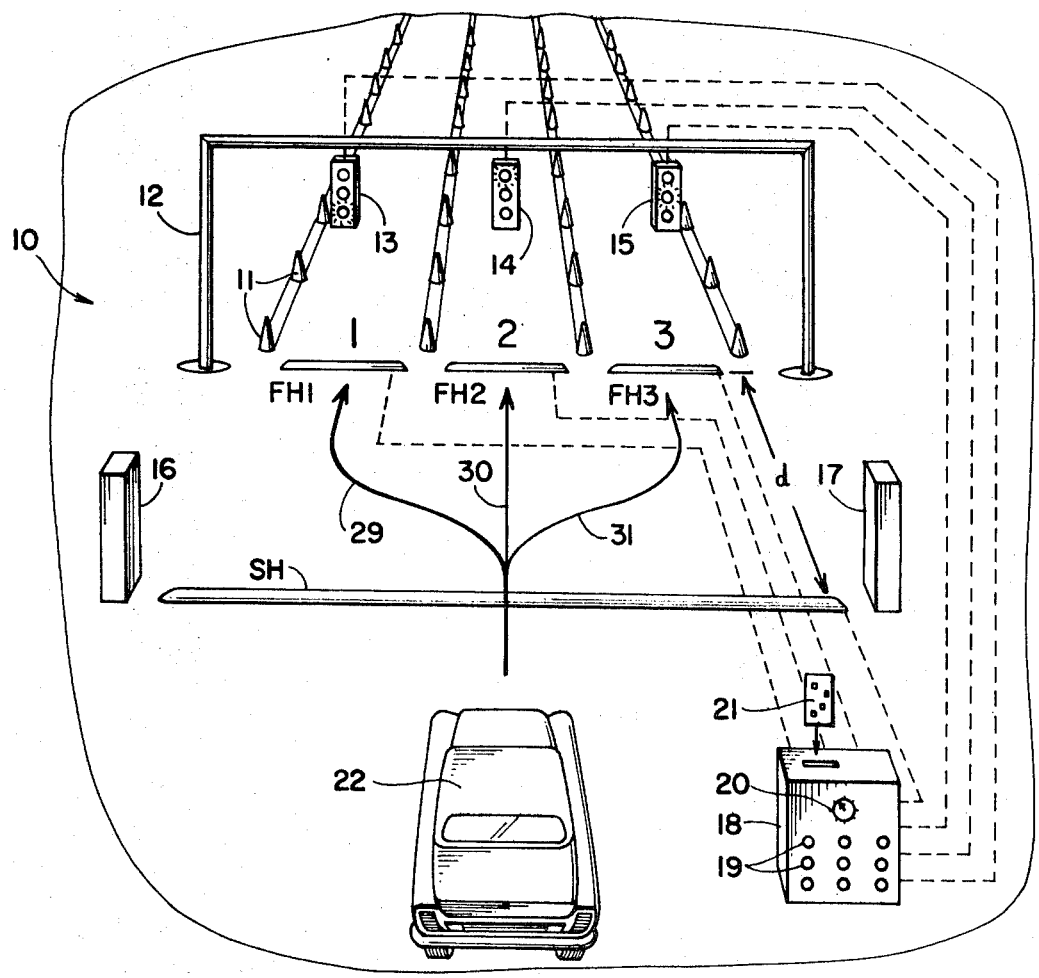
FIG. 1 is a perspective view of the preferred form of traffic hazard simulator in accord with the invention.

Referring to FIG. 1, there is illustrated within the fragmentary outline an enlarged area 10 such as a parking lot or testing ground which might be located at a Department of Motor Vehicles branch office where persons apply for driving licenses. As shown, there are established at least two and perferably three traffic lanes as by the provision of guide means such as a series of traffic cones 11 defining the lanes in question. In the embodiment shown in FIG. 1, there are three such lanes numbered 1, 2, and 3 established by the cones 11.

An indicating means preferably takes the form of a mounting stand 12 suspending traffic signals 13, 14, and 15 associated with the three lanes respectively. Each of the traffic signals includes a red, orange, and green light.

Vertical marker stands such as indicated at 16 and 17 together with an actuating switch means in the form of a start hose type switch SH are positioned at a given distance $d$ from the entrance areas to the lanes 1, 2, and 3 as shown. This actuating switch means is responsive to the passing of an automobile thereover to energize certain preselected ones of the lights in the traffic signals 13, 14, and 15.

Towards the foregoing end, there is provided a programming means in the form of a control panel 18 connected to the traffic signals 13, 14, and 15 as indicated by the dashed lines, and including a plurality of manually operable selector buttons 19. This panel also includes a timer means 20, and in a preferred embodiment, means for receiving a coded card 21.

The system is completed by the provision of deactuating switch means in the form of finish hose switches indicated at FH1, FH2, and FH3 for the lanes respectively. These deactuating hose switches as well as the actuating start hose switch SH are connected to the control panel 18 as indicated by the dashed lines.

The programming control panel 18 enables certain ones of the lights in the traffic signals 13, 14, and 15 to be preselected for energization by the actuating switch means SH when the car 22 passes thereover.

Figure 2:
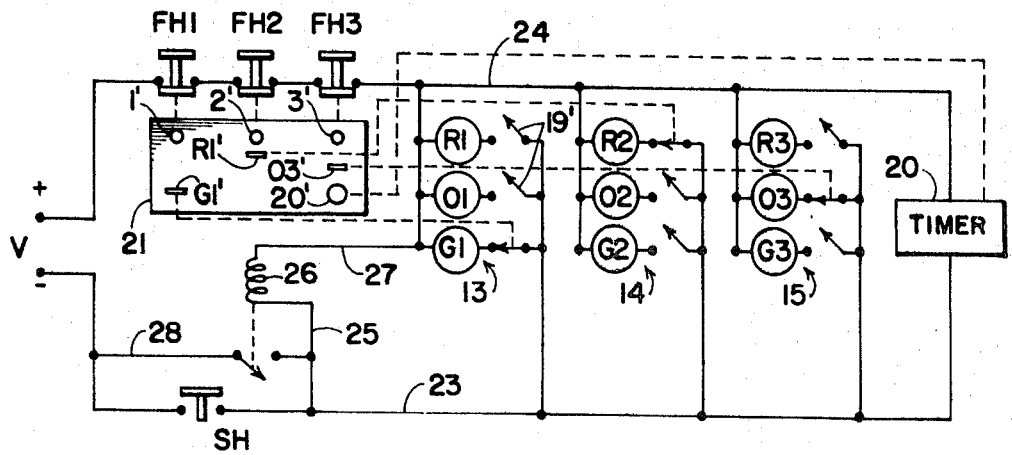
FIG. 2 is a simplified schematic circuit diagram illustrative of one type of programming means utilized in the system of FIG. 1.

Referring to FIG. 2, there is shown a simplified circuit diagram of one means for enabling a preselection of certain of the lights to be energized and the manner in which the same are energized upon actuation of the hose switch SH. In FIG. 2, there is shown first and second power lines 23 and 24 connected at the left to a suitable source of electrical energy V. The start hose switch or actuating switch means SH which is normally open, is shown disposed in series in the power line 23. The deactuating switch means in the form of the finish hose switches FH1, FH2, and FH3 are all normally closed and are shown connected in series in the power line 24.

Following these series connected switches, there is provided a lead 25, relay coil 26, and lead 27 connecting between the power lines 23 and 24 as shown. A branch lead 28 connects through a relay switch associated with the relay coil 26 to the line 25 and is thus in parallel with the actuating switch SH when the relay is closed.

The various signal lights 13, 14, and 15 are designated by similar numerals in FIG. 2 and are individually identified as red, orange, or green for the three lights by the symbols R1, O1, and G1 for the traffic signal 13; R2, O2, and G2 for the traffic signal 14; and R3, O3, and G3 for the traffic signal 15. Light switch means are individually associated with these individual lights such as indicated at 19' and are closed manually by operation of the corresponding buttons 19 on the programming panel 18 of FIG. 1. Each set of three lights are essentially connected in parallel between the power leads 23 and 24 as shown and any one light can only be energized when its associated light switch 19' is closed and power is applied between the leads 23 and 24.

The circuit is completed by the timer 20 connected between the ends of the leads 23 and 24 as shown.

OPERATION

The operation of the traffic hazard simulator in accord with the invention for testing an automobile driver's ability will now be described.

Initially, a driver to be tested will drive his car such as the car 22 as shown in FIG. 1 towards the three lanes at a given speed; for example, thirty miles per hour or forty-four feet per second. Certain of the lights in the traffic signals 13, 14, and 15 are preselected or "readied" for operation by an instructor or testing supervisor depressing corresponding ones of the buttons 19. For example, and with reference to FIG. 2, the buttons for preselecting certain lights have been selected to close the switch associated with the green light in the traffic signal 13, the red light in the traffic signal 14, and the orange light in the traffic signal 15. However, none of these lights will be energized since there is no power between the power leads 23 and 24 of FIG. 2 until the actuating switch means in the form of the start hose switch SH has been closed.

With the preselected lights set into the programming unit 18, when the driver of the automobile 22 passes over the actuating switch means in the form of the hose switch SH, energy will be applied to the power leads 23 and 24. This energy will appear across the relay coil 26 to close the corresponding relay switch and thus maintain power lead 23 energized through the lead 28 and branch lead 25 even though the hose switch SH opens after passing of the automobile.

With power now supplied between the leads 23 and 24, the green light G1, red light R2, and orange light O3 will be energized and indicated to the driver at the exact point in time that he passes over the hose switch; that is, when he is at the distance $d$ from the entrance to the lanes.

The driver must now recognize which lanes are defined as open or closed to traffic in accord with the signals displayed. He must then maneuver his car accordingly to cause it to travel down that lane which is open, which, in the example chosen, would be lane 1. Thus, to correctly pass the test or properly maneuver his car, the driver would follow the heavy arrow path 29 in FIG. 1 and avoid the arrow paths 30 and 31.

The time period for the driver to execute the maneuver is determined by the given speed of travel and the distance $d$. In the example chosen of forty-four feet per second, if the distance $d$ is made eighty-eight feet, the driver will have approximately two seconds to decide on the proper maneuver and execute the same.

With reference again to FIG. 2, when the driver enters the lane cleared for traffic, he will depress the corresponding finish hose switch or deactuating means which, in the example chosen for illustrative purposes, would be the deactuating switch means FH1 thereby removing power from the power lead 24 in the circuit of FIG. 2. Opening of this circuit de-energizes the relay coil 26 to permit the corresponding switch to open and thus remove power supplied by the lead 28. Accordingly, even after the car passes the deactuating switch so that it resumes its normally closed position, power is permanently removed from the power leads 23 and 24 until a next successive automobile again actuates the start hose switch SH to carry out a subsequent test on another driver.

Still with reference to FIG. 2, it will be noted that when the finish hose switch FH1 is opened to remove power from the leads 23 and 24, the timer 20 is also automatically de-energized. A period of time is thus recorded on the timer and, if this time is more than two seconds in the example chosen, it will be evident that the driver's speed dropped below the thirty mile per hour given speed.

If the criteria for a successful passing of the test is maneuvering of the car into the green light lane or orange light lane, should the other two lights be red, within two seconds, it can readily be determined if a driver has passed or failed. Any incorrect entry into the lane resulting in the knocking over of one or more of the traffic cones would, of course, indicate failure of the test. Also, should the timer indicates a period of time longer than two seconds, the driver would fail the test.

From the foregoing description, it will be evident that a number of different combinations of selected lights can be chosen so that the test may be repeated on a single driver without his knowing which particular lane he is to enter. Further, it is possible to have all of the lights red in which case the driver is required to stop before entering any lane.

In accord with a refinement of the invention, the card 21 described in FIG. 1 may be utilized with the programming unit 18. Thus, with reference to FIG. 2, the card is schematically illustrated within the circuit. This card includes a coded signal which might be provided by punched out portions corresponding in position to desired light switches to be closed in the preselection process. In the card shown in FIG. 2, such punches are indicated at G1', R2' and O3' for closing the corresponding switches associated with the lights G1, R2, and O3. The interconnection is indicated by the dashed lines. In addition, the card could include three areas 1', 2', and 3' which would be stamped or marked depending upon which of the finish hose switches FH1, FH2, or FH3 was operated thereby indicating on the card the particular lane into which the car was maneuvered. Finally, the actual time period elapsed would be automatically imprinted on the card such as at the area 20' by the timer 20 in response to operation of one of the deactuating switch means FH1, FH2, or FH3.

By providing a card for each individual driver which card would include the driver's name or an identifying number, several drivers could be successively tested, the respective cards being removed after each driver completes his test and passed to a central office for grading.

From the foregoing description, it will be evident that the present invention has provided a unique and valuable method and system for simulating traffic hazards all to the end that the driving ability of an automobile driver may be realistically tested.

What is claimed is:

1. A method of testing the driving ability of an automobile driver, comprising the steps of:
   (a) establishing at least two traffic lanes;
   (b) predetermining for each lane indications as to whether the lane is open or closed for traffic;
   (c) preventing said driver from being aware of said indications as he approaches said lanes with said lanes in full view until he is within a given distance of said lanes; and
   (d) rendering the driver aware of said indications at a given point in time when he is at said given distance from said lanes and traveling at a given speed, whereby
   said driver's ability to recognize the problem of which lane is open, arrive at a correct solution to travel on that lane, slow down, or stop, and execute said solution correctly all within a given time period as determined by said given distance and said given speed, is tested.

2. The method of claim 1, in which said indications comprise traffic signals in the form of red and green lights.

3. The method of claim 1, in which there are established three lanes in side-by-side relationship, said indications comprising traffic signals in the form of red, orange, and green lights associated with each lane.

4. The method of claim 1, including the step of defining said lanes by traffic cones so that failure of the driver to correctly execute said solution may be indicated by the toppling over of one or more of said cones by the automobile hitting the same.

5. A traffic hazard simulator for testing the driving ability of an automobile driver, comprising:
   (a) guide means defining at least two traffic lanes;
   (b) indicating means associated with each of said lanes for providing indications to a driver, upon actuation, as to whether the associated lane is open or closed to traffic;
   (c) programming means connected to said indicating means for presetting given indications so that said driver is aware of said given indications when said indicating means is actuated in response to actuation of said programming means; and
   (d) actuating means connected to said programming means and responsive to the presence of an automobile at a given distance from said lanes for actuating said programming means whereby a driver driving towards said lanes at a given speed will operate said actuating means when at said given distance from said lanes and be provided with a period of time in seconds defined by the said distance in feet divided by said given speed in feet per second, to recognize the indications provided by said indicating means, arrive at a proper maneuver of his automobile, and execute said maneuver correctly.

6. A simulator according to claim 5, in which said indicating means comprises a traffic signal including red and green lights.

7. A traffic hazard simulator for testing the driving ability of an automobile driver, comprising, in combination:
   (a) guide means defining a plurality of traffic lanes;
   (b) a plurality of traffic signals associated with said lanes, respectively, each traffic signal including a red, orange, and green light to indicate, when said lights are energized, whether or not the associated lane is open to traffic;
   (c) programming means connected to said traffic signals and including light switch means associated with said lights for enabling selected ones of said lights to be energized when power is applied to said light switch means; and
   (d) actuating switch means for connecting power to said light switch means disposed at a given distance from the entrance areas of said lanes and operable in response to an automobile passing thereover whereby a driver must decide which lanes are open or closed to traffic as indicated by said lights and attempt to maneuver his automobile accordingly within the time period defined by said given distance and the speed at which said automobile is traveling.

8. A simulator according to claim 7, in which said guide means comprise traffic cones periodically positioned to define said lanes, whereby any knocking over of a cone or cones by the automobile indicates a poorly executed maneuver by said driver.

9. A simulator according to claim 7, including timer means in said programming means connected to said actuating switch means for energization thereby; and a plurality of deactuating switch means positioned at the entrance areas of said lanes respectively and responsive to an automobile passing thereover to disconnect power from said timer means whereby there is indicated by said timer means the length of time for said automobile to travel said given distance.

10. A simulator according to claim 9, including card means having a preselected code for insertion in said programming means, said light switch means being responsive to said code to define said selected ones of said lights to be energized, said timer means being responsive to said deactuating switch means to mark on said card said time period and the particular one of said deactuating switch means engaged by said automobile being responsive to such engagement to mark said card and thereby indicate on said card the particular lane traveled by said automobile.

References Cited

UNITED STATES PATENTS 3,231,856  1/1966  Auer _____ 340—41

WILLIAM H. GRIEB, Primary Examiner

U.S. Cl. X.R.

340—41

Disclaimer 3,608,210.—*Paul Henry O'Shea*, Newport Beach, Calif. TRAFFIC HAZARD SIMULATOR. Patent dated Sept. 28, 1971. Disclaimer filed Oct. 30, 1980, by the assignee, *California Automotive Research*.

Hereby enters this disclaimer to claims 1 through 8 of said patent.

[*Official Gazette March 3, 1981.*]